(12) United States Patent
Matthews et al.

(10) Patent No.: US 8,423,698 B2
(45) Date of Patent: Apr. 16, 2013

(54) CONVERSION OF RESETS SENT TO A SHARED DEVICE

(75) Inventors: David L. Matthews, Cypress, TX (US); Hubert E. Brinkmann, Spring, TX (US); Paul V. Brownell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 12/935,541

(22) PCT Filed: Apr. 2, 2008

(86) PCT No.: PCT/US2008/059066
§ 371 (c)(1),
(2), (4) Date: Sep. 29, 2010

(87) PCT Pub. No.: WO2009/123629
PCT Pub. Date: Oct. 8, 2009

(65) Prior Publication Data
US 2011/0029710 A1 Feb. 3, 2011

(51) Int. Cl.
*G06F 13/36* (2006.01)
(52) U.S. Cl.
USPC .......................................... 710/311; 710/313
(58) Field of Classification Search .......... 710/306–315, 710/1–3; 713/1–2
See application file for complete search history.

(56) References Cited

U.S. PATENT DOCUMENTS

| 5,829,048 | A | 10/1998 | Ofer et al. | |
|---|---|---|---|---|
| 6,370,644 | B1 | 4/2002 | Laberge et al. | |
| 7,979,592 | B1* | 7/2011 | Pettey et al. | 710/3 |
| 2004/0158668 | A1 | 8/2004 | Golasky et al. | |
| 2007/0027952 | A1 | 2/2007 | Boyd et al. | |
| 2007/0156934 | A1* | 7/2007 | Ho et al. | 710/105 |
| 2007/0240018 | A1 | 10/2007 | Nalawasi et al. | |
| 2008/0147943 | A1* | 6/2008 | Freimuth et al. | 710/240 |
| 2009/0113430 | A1* | 4/2009 | Riley | 718/101 |
| 2010/0100717 | A1* | 4/2010 | Puri et al. | 713/1 |
| 2011/0138161 | A1* | 6/2011 | Watkins et al. | 713/2 |

FOREIGN PATENT DOCUMENTS

| CN | 1383074 | 12/2002 |
|---|---|---|
| JP | 2007109045 | 4/2007 |

OTHER PUBLICATIONS

Anonymous, PCI Express 2.0 Base Specification Revision 0.9, PCI Express, Sep. 11, 2006, XP002665241, pp. 190, 195, 384-390.

* cited by examiner

*Primary Examiner* — Raymond Phan (57) ABSTRACT

Embodiments include methods, apparatus, and systems for converting resets in a shared I/O system. One embodiment includes a method that propagates a first type of reset from a host computer to a multi-function device that shares I/O operations with other hosts. The first type of reset is converted to a second type of reset to prevent the host from resetting functions bound to the other hosts at the multi-function device.

20 Claims, 5 Drawing Sheets

CONVERSION OF RESETS SENT TO A SHARED DEVICE

BACKGROUND

The Peripheral Component Interconnect or PCI Standard defines a computer bus for attaching peripheral devices to a motherboard. The PCI specification describes the physical attributes of the bus, electrical characteristics, bus timing, communication protocols, and more. A PCI Special Interest Group (PCI-SIG) maintains and governs the specifications for various PCI architectures.

In a PCI environment, a host can reset a peripheral device by transmitting a reset command to the device. The reset command is propagated downstream through the PCI hierarchy to reset the device. This procedure works well in environments in which the host does not share the peripheral device with other hosts.

In a shared I/O environment, multiple different hosts share one or more functions of the I/O devices. When a host transmits a reset to a shared I/O device, the reset propagates down the shared PCI link. As a result, the host resets functions of a shared device that it does not own. In other words, the host inadvertently resets functions that are bound to other hosts. This can cause problems since a host could reset functions owned by other hosts.

DETAILED DESCRIPTION

Exemplary embodiments are directed to methods, systems, and apparatus for converting resets in shared input/output (I/O) architecture. One embodiment converts a hot reset PCI command to a functional level reset while the hot reset is in transit to a peripheral device or endpoint (such as an I/O device). This conversion enables a host to reset only the function bound to the host and not also reset other functions bound to other hosts.

Exemplary embodiments are applied in shared I/O environments that use, for example, PCI architecture. The conversion of an in-band hot reset to a functional level reset allows hosts to only reset a particular shared function instead of resetting the link on which that function resides. This prevents a host from resetting functions it does not own but still allows a host to seamlessly reset its virtual device that the host believes is directly attached to a virtual peer-to-peer (P2P) downstream port.

By way of illustration, in a PCI-Express system the in-band hot reset mechanism is used to propagate a reset through a PCI-Express hierarchy from top down. Hot resets in PCI-Express are only propagated downstream from an upstream port.

In one embodiment, the I/O devices are physically disaggregated from a blade server. These I/O devices, however, are still seen as being directly attached by the host residing on each blade server. The host sees these virtual devices through a P2P bridge device. This device is also seen as an endpoint on the other side and is attached to a PCI-Express switch. The host does not see this switch or other physical devices and links between the virtual P2P bridge and his virtual end device that the host believes is directly behind the P2P bridge.

In one embodiment, the upstream port attached to the virtual P2P bridge issues an in-band hot reset and expects this reset to propagate through the bridge and onto the link thus resetting end device of the host. Physically, this link does not exist. Instead, a PCI-Express switch exists and functions as an upstream device on this link. Since in PCI-Express a hot reset can only be propagated downstream, it cannot be sent on this physical link. Also since the switch links are transparent to the host and cannot be seen by the host, they should not be reset by the host. In order to get this hot reset to the shared end device, exemplary embodiments convert or transform this hot reset protocol to another PCI-Express protocol called a functional level reset.

A functional level reset resets only a particular function of a device and not all functions like a hot reset. The virtual P2P device knows which resource is due to receive the hot reset and uses the functional level reset protocol to propagate this reset to the shared function on the other end of the shared I/O network.

Figure 1:
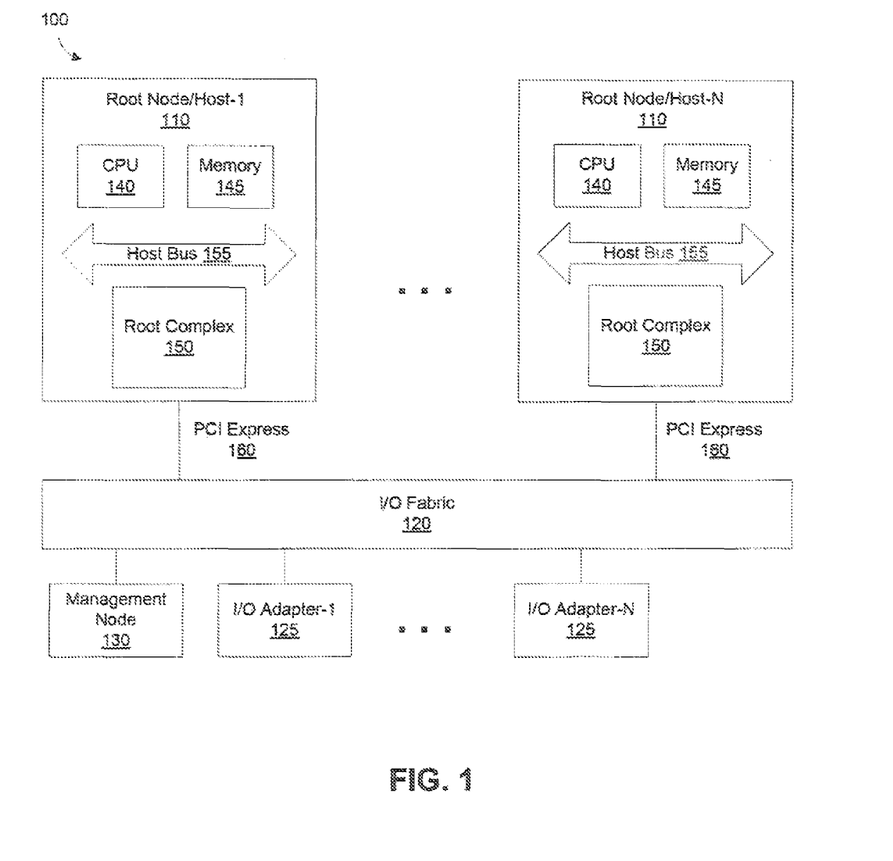
FIG. 1 is a block diagram of a computer system using a shared I/O architecture in accordance with an exemplary embodiment.

FIG. 1 is a block diagram of a computer system 100 using a shared I/O architecture in accordance with an exemplary embodiment. For illustration, the computer system is shown using PCI Express architecture, but exemplary embodiments are not limited to any particular type of PCI architecture.

Figure 2:
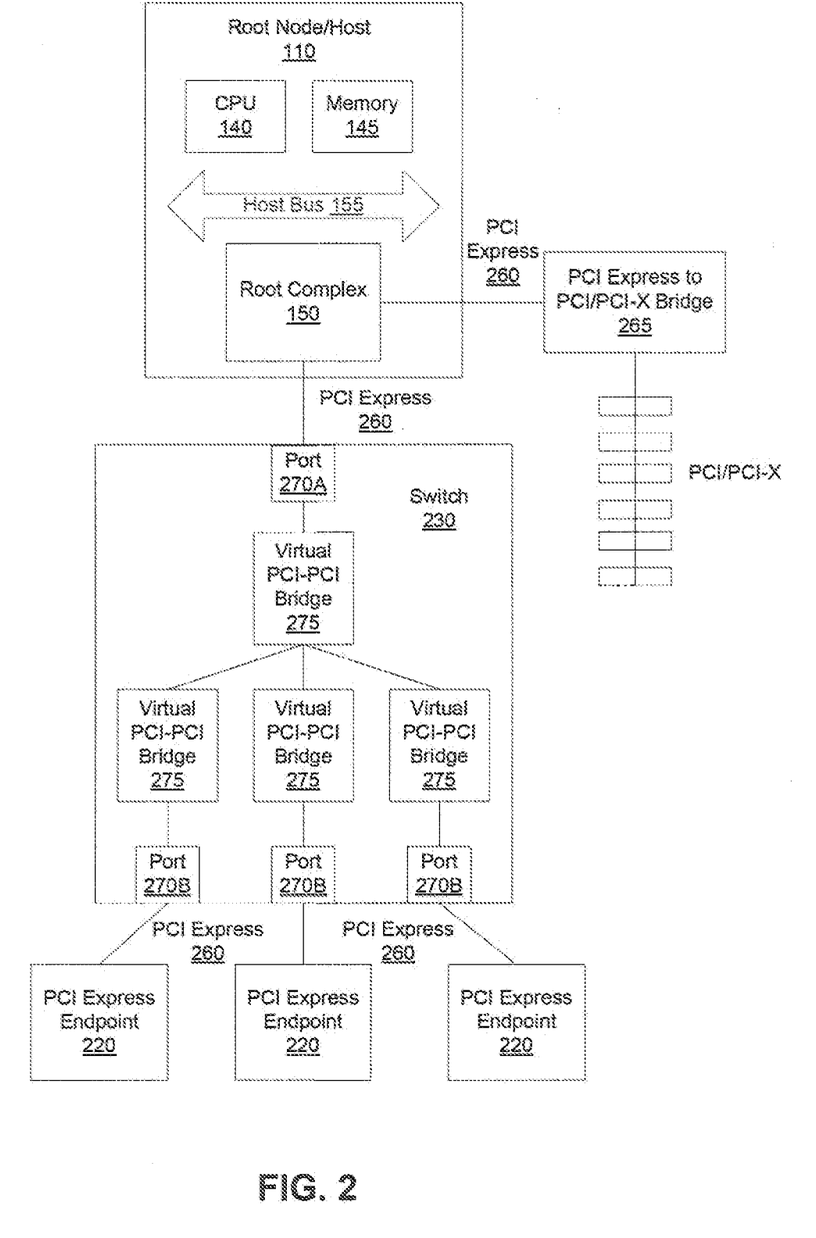
FIG. 2 is a block diagram of a computer system using a shared I/O architecture and showing a view of a single host computer in accordance with an exemplary embodiment.
Figure 3:
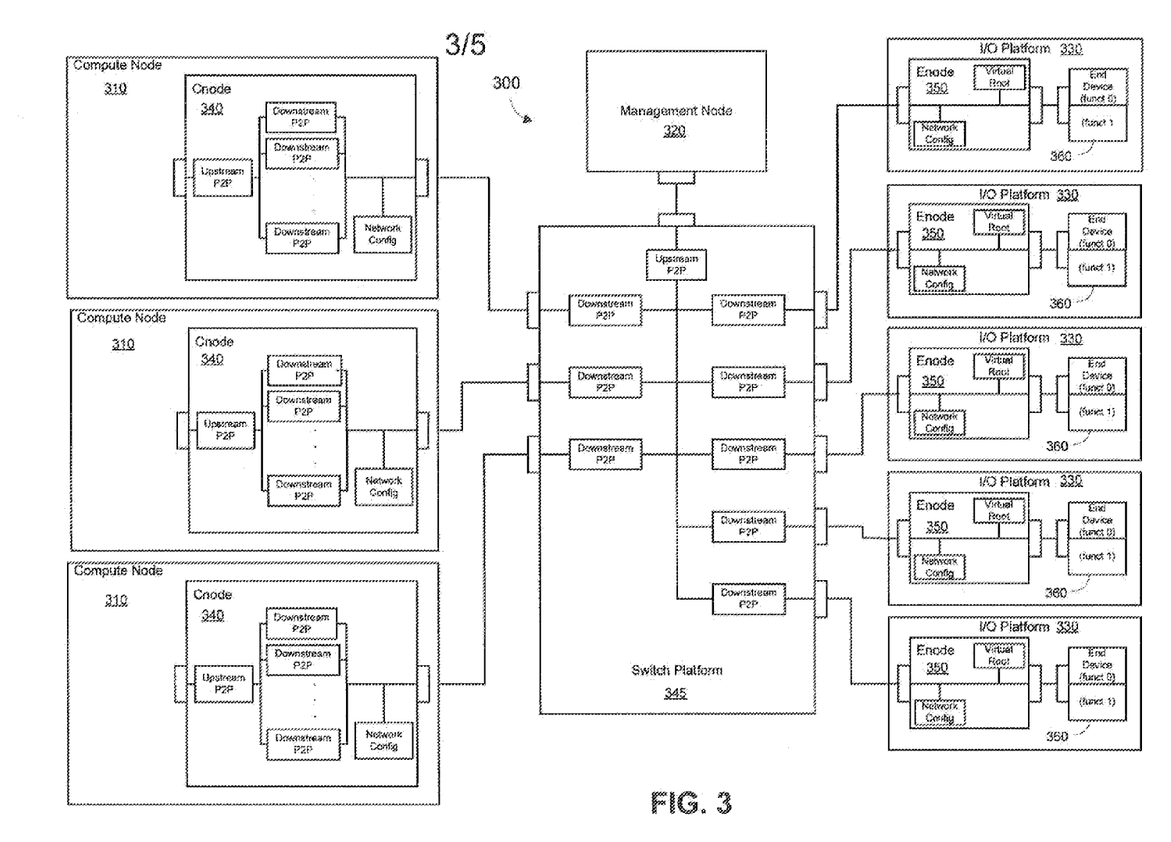
FIG. 3 is another block diagram of a computer system using a shared I/O architecture in accordance with an exemplary embodiment.

FIG. 1 shows a hierarchy that includes multiple root nodes or host computers 110 (shown as Root Node/Host-1 to Root Node/Host-N) connected to an I/O fabric 120, multiple I/O adapters 125 (shown as I/O Adapter-1 to I/O Adapter-N), and a management node 130. As shown in FIGS. 2 and 3, the root nodes connect to various devices (such as endpoints or end-nodes, bridges, switches, etc.) through multiple PCI Express buses or links 160.

The root nodes 110 (also known as compute nodes) include a CPU 140, memory 145, and root complex 150 coupled through a host bus 155. The root complexes 150 connect to I/O adapters 125 and management node 130 through the I/O fabric 120. By way of example, the I/O fabric 120 includes one or more of ports, bridges, switches, etc.

The root complexes (RC) 150 denote the root of an I/O hierarchy that connects the CPU/memory subsystem to the I/O devices. A root complex can support one or more ports.

Each interface defines a separate hierarchy domain, and each hierarchy domain includes a single endpoint or a sub-hierarchy containing one or more switch components and endpoints. The capability to route peer-to-peer (P2P) transactions between hierarchy domains through a root complex is optional and implementation dependent. For example, an implementation can include a real or virtual switch internally within the root complex to enable full peer-to-peer (P2P) support in a software transparent way.

A root complex 150 can function or support one or more of the following: support generation of configuration requests as a requester, support the generation of I/O requests as a requester, and support generation of locked requests as a requester.

In one exemplary embodiment, the hosts 110 share a pool of resources through the I/O fabric 120 (which includes various devices conforming to the PCI Express specification). In this configuration, multiple, different hosts can share I/O adapters 125 which can be single or multi-function adapters and ultimately end points (shown in more detail in FIGS. 2 and 3). Further, the hosts can be connected together (for example, to form a Symmetric Multi-Processing (SMP) system) or can be independent nodes.

The management node 130 configures shared resources and assigns resources to the hosts 110. The management node 130 can be attached to the I/O fabric 120 or included in one of the hosts.

FIG. 2 is a block diagram of a computer system using a shared I/O architecture and showing a view as seen by a single host computer (i.e., a view of the network from the perspective of the host) in accordance with an exemplary embodiment. The host 110 connects to a switch 230 and PCI/Express to PCI/PCI-X Bridge 265 through multiple PCI Express buses or links 260. The switch, in turn, connects to multiple endpoints or endnodes which include PCI Express endpoints 220. In one embodiment, the PCI Express endpoints 220 are disaggregated from the switch 230. In other words, the endpoints are not physically connected to the ports 270B.

Endpoints (shown in FIGS. 2 and 3) include both virtual endpoints and actual or physical endpoints. A physical or actual endpoint is a device or collection of devices that can be a requester or completer of a PCI transaction either on its own behalf or on behalf of a distinct non-PCI device (other than a PCI device or host CPU), e.g., a PCI Express attached graphics controller, a PCI Express-USB host controller, etc. or other I/O device (such as a disk drive). By contrast, virtual endpoints represent devices that are not actually and physically present and/or connected to the computer system. Thus, a host 110 detects or believes that physical devices are connected to slots/ports in the computer system, but in reality no physical device actually exists.

As shown, the switch 230 includes a plurality of ports 270 and plurality of virtual PCI-PCI bridges 275. For illustration, switch 230 is shown with one upstream port 270A and three downstream ports 270B. More upstream and downstream ports can be provided to accommodate connections with the multiple hosts (shown in FIG. 1). The switch connects or communicates with one or more physical endpoints 220 through PCI links 260.

The switch follows one or more of the following rules: switches appear to configuration software as two or more logical PCI-to-PCI Bridges, a switch forwards transactions using PCI bridge mechanisms (such as address based routing), and a switch forwards various types of transaction layer packets between sets of ports.

In one embodiment, each PCI Express link 260 is mapped through a virtual PCI-to-PCI bridge structure and has a logical PCI bus associated with it. The virtual PCI-to-PCI Bridge structure can be part of a PCI Express root complex port, a switch upstream port, or a switch downstream port. A root port is a virtual PCI-to-PCI bridge structure that originates a PCI Express hierarchy domain from a PCI Express root complex. Devices are mapped into configuration space such that each will respond to a particular device number.

FIG. 3 is a block diagram of a computer system 300 using a shared I/O architecture and showing connection of multiple hosts computers to multiple shared endpoints or I/O platforms. The computer system 300 includes a plurality of compute nodes 310 connected a management node 320 and to a plurality of endpoints or I/O platforms 330 through a switch platform 345.

Each compute node 310 includes a bridge or Cnode 340 having a network configuration (shown as box "Network Config") and one or more upstream P2P ports (shown as box "Upstream P2P") and downstream P2P ports (shown as box "Downstream P2P"). The Cnode 340 connects to a downstream port (shown as box "Downstream P2P") in switch platform 345.

The switch platform 345 includes one or more upstream P2P ports (shown as box "Upstream P2P") and downstream P2P ports (shown as box "Downstream P2P"). These ports couple the compute nodes 310, management node 320, and I/O platforms 300 together.

Each I/O platform 330 includes an Enode 350 and an end device 360. Further, the Enodes 350 include a virtual root (shown as box "Virtual Root") and a network configuration (shown as box "Network Config"). The end devices 360 are multi-functional and include a first function (shown as box "(funct 0)") and a second function (shown as box "(funct 1)").

Figure 4:
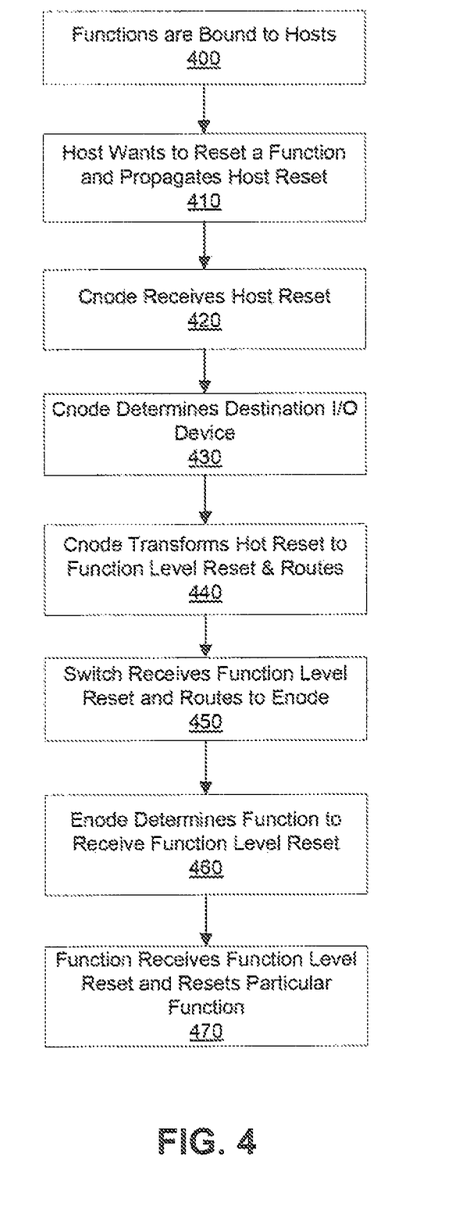
FIG. 4 is a flow diagram for converting hot resets to function level resets in a computer system using a shared I/O architecture in accordance with an exemplary embodiment.

FIG. 4 is a flow diagram for converting hot resets to function level resets in a computer system using a shared I/O architecture in accordance with an exemplary embodiment. The method of FIG. 4 can be implemented in the computer systems shown in FIGS. 1-3.

For illustration, FIG. 4 is discussed in connection with FIG. 5 which shows portions of an exemplary computer system 500 using a shared I/O architecture. The computer system 500 includes plural hosts 510 that connect to plural multi-functional devices 520 (one device being shown for illustration) through plural Cnodes 530, a PCI-Express switch 540, and an Enode 550. Also shown is a middle manager 560 coupled to the PCI-Express switch 540.

According to block 400, functions are bound to hosts. By way of example, multi-functional device 520 is shown with five different functions (shown as boxes F0 to F4). For illustration, host A is bound to one function (F1), and host B is bound to another function (F3). By way of further example, the multi-function device 520 can be an Ethernet device with each function (F0 to F4) being a shared I/O device.

According to block 410, a host wants to reset a function and propagates a host reset. Resets can occur for various reasons. For example, a host can receive errors from a device and desire to reset it.

Host A is shown to issue a hot reset for one function (F1), and host B is shown to issue a hot reset for another function (F3).

Host A only sees or detects a single function device and hence is unaware of other functions (namely, F0, F2, F3, and F4). From the perspective of host A, multi-function device 520 is actually a single function device with one function (i.e., function F1). If the hot reset issued by host A were not converted to a function level reset (FLR), then host A would inadvertently reset all functions at the multi-function device 520. In other words, host A would reset functions (namely, namely, F0, F2, F3, and F4) not bound to host A.

Likewise, host B only sees or detects a single function device and hence is unaware of other functions (namely, F0, F1, F2, and F4). From the perspective of host B, multi-function device 520 is actually a single function device with one function (i.e., function F3). If the hot reset issued by host B were not converted to a function level reset (FLR), then host B would inadvertently reset all functions at the multi-function device 520. In other words, host B would reset functions (namely, namely, F0, F1, F2, and F4) not bound to host B.

According to block 420, a Cnode (or bridge) receives the hot reset. The hot reset from host A propagates to the virtual bridge (shown in box "Virtual Bridge") of Cnode A. Likewise, the hot reset from host B propagates to the virtual bridge (shown in box "Virtual Bridge") of Cnode B. The Cnodes are virtual bridges that are seen as being bridges with endpoints directly behind them. The Cnodes are seen as endnodes or endpoints to the middle manager 560. In other words, the hosts do not see the PCI-Express switch 540 or Enode 550.

According to block 430, the Cnode determines the destination I/O device for the received hot reset. Thus, for host A, the Cnode A determines that the hot reset is destined for one function (F1). For host B, the Cnode B determines that the hot reset is destined for another function (F3).

According to block 440, the Cnode transforms the hot reset into a function level reset (FLR) and routes the FLR to the destination. In other words, the initial hot reset is converted into a FLR and the propagated as a FLR. As shown in FIG. 5, Cnode A receives the hot reset, converts it to a FLR A, and propagates the FLR A to PCI-Express switch 540. Likewise, Cnode B receives the hot reset, converts it to a FLR B, and propagates the FLR B to PCI-Express switch 540.

In one exemplary embodiment, the Cnode builds a configuration cycle to perform the function level reset. The Cnode encapsulates the configuration cycle into a header of a message or packet for routing to the PCI-Express switch 540. The payload of the message or packet contains the configuration cycle.

According to block 450, the switch receives the function level reset and routes it to the Enode. As shown in FIG. 5, PCI-Express switch 540 receives the FLR A from Cnode A and FLR B from Cnode B. The switch propagates these FLRs to Enode 550.

According to block 460, the Enode receives the function level reset and determines the function to receive the FLR. In one embodiment, the Enode decodes the header, retrieves the payload, and determines which function in the multi-function device will receive the function level reset.

Figure 5:
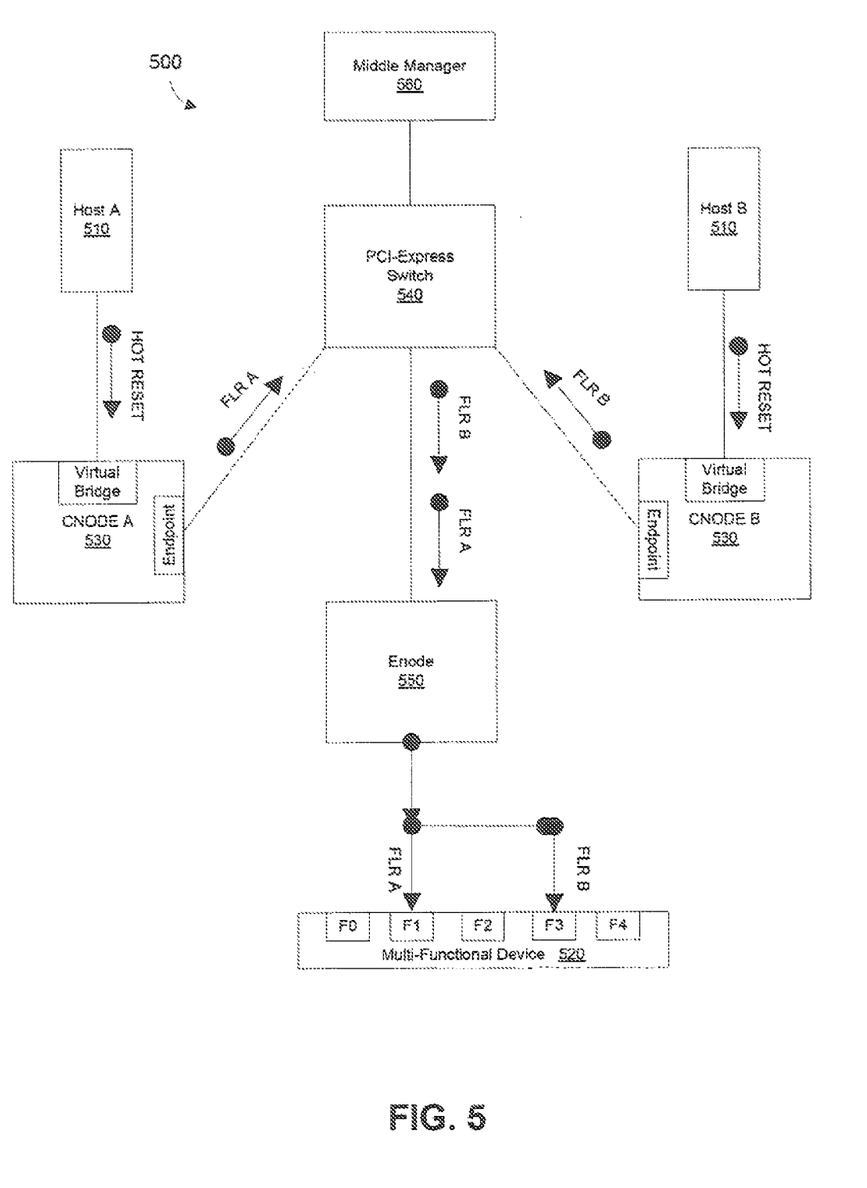
FIG. 5 is a block diagram showing portions of an exemplary computer system using a shared I/O architecture in accordance with an exemplary embodiment.

As shown in FIG. 5, Enode 550 receives the FLR A and FLR B. Each of these FLRs is decoded and routed to the correct function. FLR A is routed to one function (F1) since this function is bound to host A. FLR B is routed to routed to another function (F3) since this function is bound to host B.

According to block 470, the function receives the function level reset and resets the appropriate function. For FIG. 5, function F1 is reset according to FLR A, and function F3 is reset according to FLR B.

In general, resets provide a hardware mechanism for returning port states to an initial or specified condition. Resets can be provided as a signal from one device to another device, such as a component or adapter card. A function level reset (FLR) is a specific type of reset that enables software to quiesce (i.e., temporarily disable or make inactive) and reset endpoint hardware with function-level granularity. The following three examples illustrate a FLR.

As one example, in some systems, it is possible that the software entity that controls a function will cease to operate normally. To prevent data corruption, it may, be necessary to stop all PCI Express and external I/O (not PCI Express) operations being performed by the function. Other defined reset operations do not guarantee that external I/O operations will be stopped. As another example, in a partitioned environment where hardware is migrated from one partition to another, it may be necessary to ensure that no residual "knowledge" of the prior partition be retained by hardware, for example, a user's secret information entrusted to the first partition but not to the second. Further, due to the wide range of functions, it may be necessary that this be done in a function independent way. As a third example, when system software is taking down the software stack for a function and then rebuilding that stack, it is sometimes necessary to return the state to an uninitialized state before rebuilding the function's software stack.

FLR applies on a per function basis, and only the targeted function is affected by the FLR operation. Furthermore, the link state is not affected by the FLR (unlike a hot reset which does affect the link state). FLRs modify the function state of the device since registers and function-specific state machines are set to their initialization values. FLRs are quiescent on the link, and port state machines associated with link functionality are not reset by the FLR. Further, FLRs can be initiated to a multi-function device for resetting a specific function and not the entire multi-function device. Further information on FLRs and hot resets is found in PCI Express Base Specification Revision 2.0 (edition of Dec. 20, 2006) and incorporated herein by reference.

Definitions: As used herein and in the claims, the following words and terms are defined as follows:

The word "bridge" means a device that connects two local area networks (LANs) or segments of a LAN using a same protocol (for example, Ethernet or token ring). For example, a bridge is a function that virtually or actually connects a PCI/PCI-X segment or PCI Express port with an internal component interconnect or with another PCI/PCI-X bus segment or PCI Express port.

The term "configuration space" means address spaces within the PCI architecture. Packets with a configuration space address are used to configure a function (i.e., an address entity) within a device.

The word "downstream" means a relative position of an interconnect/system element (port/component) that is farther from the root complex. For example, the ports on a switch that are not the upstream port are downstream ports. All ports on a root complex are downstream ports. Thus, downstream also includes a direction of information flow where the information is flowing away from the root complex.

The word "endpoint" or "endnode" means a device (i.e., an addressable electronic entity) or collection of devices that operate according to distinct sets of rules.

The word "function" means an addressable entity in configuration space. Function can also refer to one function of a single function device or multi-functional device.

The terms "function level reset" or "FLR" mean a mechanism for resetting a specific endpoint function (i.e., a specific function of a device).

The word "hot-plug" or "hot swap" or the like means the ability to remove and replace an electronic component of a machine or system while the machine or system continues to operate. For example, hot swapping enables one or more devices (for example, hard drives) to be exchanged or serviced without impacting operation of an overall blade or enclosure in which the device is located. For instance, in the event of a failure, the individual hard drive is removed from the blade and replaced with a new or different hard drive. The new hard drive is connected to the blade without disrupting continuous operation of the blade while it remains in the enclosure.

The term "hot reset" means a reset propagated in-band across a link using a physical layer mechanism (i.e., a layer that directly interacts with the communication medium between two components).

The word "link" means collection of two ports and their interconnecting lanes. In PCI-Express architecture, a link is a dual simplex communications path between two components.

The acronym "PCI" means Peripheral Component Interconnect. The PCI specification describes the physical attributes of the bus, electrical characteristics, bus timing, communication protocols, and more. A PCI Special Interest Group (PCI-SIG) maintains and governs the specifications for various PCI architectures.

The word "port" logically means an interface between a component and a link (i.e., a communication path between two devices), and physically means a group of transmitters and receivers located on a chip that define a link.

The term "root complex" means a device or collection of devices that include a host bridge and one or more ports. For example, a host computer has a PCI to host bridging function that is a root complex. The root complex provides a bridge between a CPU bus (such as hyper-transport) and PCI bus.

The term "root node" means a host computer, computer system, or server.

The word "switch" means a device or collection of devices that connects two or more ports to allow packets to be routed from one port to another. To configuration software, a switch appears as a collection of virtual PCI-to-PCI bridges.

The word "virtual" means not real and distinguishes something (for example, a device) that is merely conceptual from something that has physical reality. As one example, a host can see or detect a virtual endpoint as being a physical endpoint when in fact a physical endpoint is not actually connected to the bus (the device being imaginary but detected or believed to exist by the host). The opposite of virtual is real or physical.

The word "upstream" means a relative position of an interconnect/system element (port/component) that is closer to the root complex. For example, the ports on a switch that are closet topologically to the root complex are upstream ports. For example, the port on component that contains only an endpoint is an upstream port. Upstream also includes a direction of information flow where the information is flowing toward the root complex.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising;
propagating a first type of reset from a host computer to a multi-function device that shares Input/Output (IO) operations with other hosts;
converting the first type of reset to a second type of reset while the first type of reset is in transit to the multi-function device to prevent the host from resetting functions bound to the other hosts at the multi-function device;
building a configuration cycle to perform the second type of reset;
encapsulating the configuration cycle into a message; and
routing the message to the multi-function device.

2. The method of claim 1, wherein the first type of reset is a hot reset according to a Peripheral Component Interconnect (PCI) specification, and the second type of reset is a function level reset (FLR) according to the PCI specification.

3. The method of claim 1, wherein the first type of reset resets a link on which a function resides at the multi-function device, and the second type of reset only resets a single function at the multi-function device.

4. The method of claim 1, wherein the first type of reset is converted to the second type of reset so the host only resets a function bound to the host at the multifunction device.

5. The method of claim 1, wherein the multi-function device is seen by the host as being directly attached to the host and residing on a blade server.

6. The method of claim 1 further comprising, converting the first type of reset to the second type at a virtual Peripheral Component Interconnect (PCI) bridge.

7. The method of claim 1 further comprising:
propagating the first type of reset to a Peripheral Component Interconnect (PCI) bridge;
converting the first type of reset to the second type of reset at the PCI bridge;
propagating the second type of reset from the PCI bridge to a PCI switch and then to the multi-function device.

8. The method of claim 1, further comprising:
receiving the second type of reset at a node before the multi-function device;

retrieving a payload in the second type of reset at the node to determine which function in the multi-function device to route the second type of reset; and routing the second type of reset to the function.

9. A tangible computer readable storage medium having instructions for causing a computer to execute a method, comprising:

propagating a Peripheral Component Interconnect (PCI) hot reset to a peripheral device;

converting the PCI hot reset into a function level reset (FLR) while the PCI hot reset is in transit to the peripheral device;

building a configuration cycle to perform the FLR;

encapsulating the configuration cycle into a message; and routing the message to the peripheral device.

10. The tangible computer readable storage medium of claim 9 further comprising:

generating the PCI hot reset at a root node;

converting the PCI hot reset to the FLR at a bridge between the root node and peripheral device.

11. The tangible computer readable storage medium of claim 9 further comprising, using the FLR to reset only a function bound to a root node that generated the PCI hot reset.

12. The tangible computer readable storage medium of claim 9, wherein the peripheral device includes multiple functions that are shared among plural separate host computers in a computer system.

13. The tangible computer readable storage medium of claim 9 further comprising, propagating the FLR through switches that are transparent to a host computer that generated the PCI hot reset.

14. The tangible computer readable storage medium of claim 9, wherein the PCI hot reset resets multiple functions bound to different hosts, and the FLR resets only a single function bound to one host.

15. The tangible computer readable storage medium of claim 9 further comprising:

generating the PCI hot reset at a host computer;

preventing the host computer from resetting functions at the peripheral device that are not bound to the host computer by converting the PCI hot reset to the FLR.

16. The tangible computer readable storage medium of claim 9 further comprising:

receiving the FLR at a node before the peripheral device;

retrieving a payload in the FLR at the node to determine which function in the peripheral device to route the FLR; and routing the FLR to the function.

17. A computer system, comprising:

a memory that stores a set of instruction; and a processor that executes the set of instructions to:

propagate a Peripheral Component Interconnect (PCI) hot reset to a peripheral device having resources that are shared among plural host computers in the computer system;

transform the PCI hot reset into a function level reset (FLR) while the PCI hot reset is in transit to the peripheral device;

receive the FLR at a node before the peripheral device;

retrieve a payload in the FLR at the node to determine which function in the peripheral device to route the FLR; and route the FLR to the function.

18. The computer system of claim 17 wherein the peripheral device is an Ethernet device with multiple functions bound to multiple host computers.

19. The computer system of claim 17 further comprising a PCI switch that receives the FLR and forwards the FLR to the peripheral device.

20. The computer system of claim 17 further comprising, a virtual bridge that receives the PCI hot reset and forwards the FLR to the peripheral device.

* * * * *

UNITED STATES PATENT AND TRADEMARK OFFICE
CERTIFICATE OF CORRECTION

| | | |
|---|---|---|
| PATENT NO. | : 8,423,698 B2 | Page 1 of 1 |
| APPLICATION NO. | : 12/935541 | |
| DATED | : April 16, 2013 | |
| INVENTOR(S) | : David L. Matthews et al. | |

It is certified that error appears in the above-identified patent and that said Letters Patent is hereby corrected as shown below:

In the Claims:

In column 8, line 27, in Claim 1, delete "comprising;" and insert -- comprising: --, therefor.

In column 10, line 14, in Claim 17, delete "instruction;" and insert -- instructions; --, therefor.

Signed and Sealed this
Twenty-seventh Day of August, 2013

Teresa Stanek Rea
*Acting Director of the United States Patent and Trademark Office*